United States Patent
Numrich et al.

(10) Patent No.: US 8,206,782 B2
(45) Date of Patent: Jun. 26, 2012

(54) METHOD FOR SURFACE HARDENING SUBSTANCES BY APPLICATION OF PARTICULARLY TRANSPARENT POLYMETHACRYLATE LAYERS

(75) Inventors: Uwe Numrich, Gross-Zimmern (DE); Michael Wicker, Seeheim-Jugenheim (DE); Achim Neuhaeuser, Nauheim (DE); Christoph Krohmer, Stockstadt (DE); Guenther Dickhaut-Bayer, Riedstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 862 days.

(21) Appl. No.: 10/570,194

(22) PCT Filed: Jul. 3, 2004

(86) PCT No.: PCT/EP2004/007280
§ 371 (c)(1),
(2), (4) Date: Mar. 2, 2006

(87) PCT Pub. No.: WO2005/040273
PCT Pub. Date: May 6, 2005

(65) Prior Publication Data
US 2008/0248298 A1 Oct. 9, 2008

(30) Foreign Application Priority Data
Sep. 26, 2003 (DE) .................................. 103 45 045

(51) Int. Cl.
*B05D 3/10* (2006.01)
(52) U.S. Cl. ............ 427/207.1; 156/244.11; 264/176.1; 264/212; 427/412; 525/203; 525/207; 525/208; 428/480; 428/500; 428/522; 428/523

(58) Field of Classification Search .................. 264/212, 264/176.1; 156/244.11; 427/207.1, 412; 525/203, 207, 208
See application file for complete search history.

(56) References Cited

U.S. PATENT DOCUMENTS

| | | | | |
|---|---|---|---|---|
| 3,253,060 A | * | 5/1966 | Koblitz et al. | 525/199 |
| 3,300,369 A | * | 1/1967 | Burkley et al. | 428/523 |
| 3,362,844 A | * | 1/1968 | Christenson et al. | 526/329.7 |
| 3,689,592 A | * | 9/1972 | Fock et al. | 525/203 |
| 3,983,290 A | * | 9/1976 | Elcik | 442/396 |
| 3,998,997 A | * | 12/1976 | Mowdood et al. | 526/271 |
| 4,138,450 A | * | 2/1979 | Fock et al. | 525/296 |

(Continued)

FOREIGN PATENT DOCUMENTS

DE 2634003 8/1978

(Continued)

OTHER PUBLICATIONS

Canadian Intellectual Property Office, correspondence regarding application CA 2534385, Sep. 30, 2009.*

(Continued)

*Primary Examiner* — Joseph S Del Sole
*Assistant Examiner* — Timothy Kennedy
(74) *Attorney, Agent, or Firm* — Oblon, Spivak, McClelland, Maier & Neustadt, L.L.P.

(57) ABSTRACT

The present invention describes a process for the surface finishing of materials via application of specific polymethacrylate layers. The polymethacrylate layers are composed of blends of at least two (co)polymers of polymethacrylates, and specific "reactive monomers" are present here in a polymerized mixture which forms the polymethacrylate layer. At the application temperature established, these form a chemical and, where appropriate, also a physical bond to the substrate, and therefore have adhesion-promoting action.

15 Claims, 2 Drawing Sheets

U.S. PATENT DOCUMENTS

| | | | |
|---|---|---|---|
| 4,189,520 A * | 2/1980 | Gauchel | 428/520 |
| 4,302,522 A * | 11/1981 | Garnett et al. | 430/133 |
| 4,550,057 A * | 10/1985 | Kataoka | 428/522 |
| 4,558,098 A * | 12/1985 | Kamata et al. | 525/207 |
| 4,753,996 A * | 6/1988 | Sato | 525/205 |
| 4,833,221 A | 5/1989 | Albrecht | |
| 5,066,718 A * | 11/1991 | Siol et al. | 525/84 |
| 5,110,877 A | 5/1992 | Hoess et al. | |
| 5,147,930 A * | 9/1992 | La Fleur et al. | 428/500 |
| 5,155,172 A | 10/1992 | Siol et al. | |
| 5,219,931 A | 6/1993 | Siol et al. | |
| 5,270,397 A | 12/1993 | Rhein et al. | |
| 5,280,073 A | 1/1994 | Siol et al. | |
| 5,530,080 A | 6/1996 | Siol et al. | |
| 5,548,033 A | 8/1996 | Vetter et al. | |
| 5,612,417 A | 3/1997 | Rhein et al. | |
| 5,652,316 A | 7/1997 | May et al. | |
| 5,705,189 A | 1/1998 | Lehmann et al. | |
| 5,726,245 A | 3/1998 | Numrich et al. | |
| 5,747,134 A * | 5/1998 | Mohammed et al. | 428/57 |
| 6,040,387 A | 3/2000 | Albrecht et al. | |
| 6,214,942 B1 | 4/2001 | Siol et al. | |
| 6,218,467 B1 * | 4/2001 | Wicker et al. | 525/66 |
| 6,287,470 B1 | 9/2001 | Vetter et al. | |
| 6,355,712 B1 | 3/2002 | Schultes et al. | |
| 6,420,033 B1 | 7/2002 | Numrich et al. | |
| 6,475,420 B1 | 11/2002 | Numrich et al. | |
| 6,576,255 B1 | 6/2003 | Petereit et al. | |
| 6,613,871 B2 | 9/2003 | Hoess et al. | |
| 6,667,101 B2 * | 12/2003 | Silagy et al. | 428/523 |
| 6,762,260 B2 * | 7/2004 | Sonnenschein et al. | 428/522 |
| 6,765,046 B1 | 7/2004 | Numrich et al. | |
| 6,803,416 B2 | 10/2004 | Schultes et al. | |
| 6,809,163 B2 | 10/2004 | Schultes et al. | |
| 6,890,993 B2 | 5/2005 | Schultes et al. | |
| 6,998,140 B2 | 2/2006 | Meier et al. | |
| 7,179,852 B2 | 2/2007 | Schultes et al. | |
| 7,371,795 B2 | 5/2008 | Wicker et al. | |
| 7,381,552 B2 | 6/2008 | Menzler et al. | |
| 7,456,239 B2 | 11/2008 | Theil et al. | |
| 7,498,044 B2 | 3/2009 | Petereit et al. | |
| 7,498,373 B2 | 3/2009 | Schmitt et al. | |
| 7,879,966 B2 | 2/2011 | Petereit et al. | |
| 2001/0044491 A1 * | 11/2001 | Elser et al. | 524/535 |
| 2002/0160042 A1 | 10/2002 | Petereit et al. | |
| 2003/0031847 A1 | 2/2003 | Numrich et al. | |
| 2004/0104501 A1 | 6/2004 | Petereit et al. | |
| 2005/0080188 A1 | 4/2005 | Schultes et al. | |
| 2005/0164007 A1 | 7/2005 | Numrich et al. | |
| 2006/0052515 A1 | 3/2006 | Schultes et al. | |
| 2006/0121248 A1 | 6/2006 | Lorenz et al. | |
| 2006/0147714 A1 | 7/2006 | Schultes et al. | |
| 2006/0175735 A1 | 8/2006 | Hoess et al. | |
| 2007/0055017 A1 | 3/2007 | Schultes et al. | |
| 2007/0066708 A1 | 3/2007 | Goldacker et al. | |
| 2007/0122624 A1 | 5/2007 | Schultes et al. | |
| 2007/0123610 A1 | 5/2007 | Schultes et al. | |
| 2007/0185270 A1 | 8/2007 | Arndt et al. | |
| 2007/0197703 A1 | 8/2007 | Neuhäuser et al. | |
| 2007/0222117 A1 | 9/2007 | Hoess et al. | |
| 2007/0276093 A1 | 11/2007 | Schultes et al. | |
| 2008/0132627 A1 | 6/2008 | Schultes et al. | |
| 2008/0161469 A1 | 7/2008 | Hoss et al. | |
| 2008/0242782 A1 | 10/2008 | Hager et al. | |
| 2008/0248298 A1 | 10/2008 | Numrich et al. | |
| 2008/0305335 A1 | 12/2008 | Schultes et al. | |
| 2009/0043044 A2 | 2/2009 | Scharz-Barac et al. | |
| 2009/0105399 A1 | 4/2009 | Schultes et al. | |
| 2010/0098907 A1 | 4/2010 | Schultes et al. | |
| 2010/0098908 A1 | 4/2010 | Schultes et al. | |
| 2010/0148401 A1 | 6/2010 | Schultes et al. | |
| 2010/0167045 A1 | 7/2010 | Schultes et al. | |
| 2010/0174022 A1 | 7/2010 | Schultes et al. | |
| 2010/0189983 A1 | 7/2010 | Numrich et al. | |
| 2010/0213636 A1 | 8/2010 | Schmidt et al. | |
| 2010/0272960 A1 | 10/2010 | Schultes et al. | |
| 2011/0009539 A1 | 1/2011 | Goldacker et al. | |
| 2011/0015317 A1 | 1/2011 | Khrenov et al. | |
| 2011/0290300 A1 | 2/2011 | Battenhausen et al. | |
| 2011/0269883 A1 | 11/2011 | Battenhausen et al. | |

FOREIGN PATENT DOCUMENTS

| | | |
|---|---|---|
| DE | 39 08 626 | 3/1990 |
| DE | 39 08 626 C1 | 3/1990 |
| DE | 3908626 C | 3/1990 |
| DE | 3908626 C1 * | 3/1990 |
| DE | 3842796 A1 | 6/1990 |
| DE | 43 37 062 | 5/1995 |
| DE | 4337062 A1 | 5/1995 |
| DE | 100 10 533 | 9/2000 |
| DE | 10010533 A1 | 9/2000 |
| EP | 0 271 068 | 6/1988 |
| EP | 0271068 A2 | 6/1988 |
| EP | 0 911 148 | 4/1999 |
| EP | 0911148 A2 | 4/1999 |
| JP | 9-193189 | 7/1997 |
| WO | WO 00/37237 | 6/2000 |

OTHER PUBLICATIONS http://www.dow.com/products/product_detail.p.?product=1010171&application=1120094.*
U.S. Appl. No. 12/092,276, filed May 1, 2008, Numrich, et al.
U.S. Appl. No. 11/912,941, filed Oct. 29, 2007, Guenanten, et al.
U.S. Appl. No. 11/816,130, filed Aug. 13, 2007, Numrich, et al.
U.S. Appl. No. 11/721,979, filed Jun. 16, 2007, Goldacker, et al.
U.S. Appl. No. 11/814,704, filed Jul. 25, 2007, Neuhaeuser, et al.
Rompp Chemie Lexikon, H-L, Herausgegeben, von, Juergen Falbe, Manfred Regitz, Thieme, Georg Theime Verlag Stuttgart, New York, pp. 2252-2255.
J. G. Lertola, et al., "Consolidation of High-Modulus Pet Laminates and the Role of Chemical Healing," Journal of Applied Polymer Science, vol. 40, 113-126 (1990).
N. Avramova, et al., "Liquid Crystalline Polymer Laminates," Journal of Applied Polymer Science, vol. 42, 979-984 (1991).
U.S. Appl. No. 11/720,653, filed Jun. 1, 2007, Schultes, et al.
U.S. Appl. No. 60/831,222, filed Jul. 17, 2006, Hager, et al.
U.S. Appl. No. 12/300,408, filed Nov. 11, 2008, Hoess, et al.
U.S. Appl. No. 12/436,809, filed May 7, 2009, Schultes, et al.
Canadian Office Action mailed Jun. 14, 2010.
Claims 1-6 from corresponding Canadian Application No. 2,534,385.
Notice of Preliminary Rejection dated Nov. 16, 2010 (with English translation).
Canadian Office Action mailed Feb. 21, 2011.
U.S. Appl. No. 11/748,874, filed May 15, 2007, Schultes, et al.
U.S. Appl. No. 13/241,776, filed Sep. 23, 2011, Hoess, et al.

* cited by examiner

METHOD FOR SURFACE HARDENING SUBSTANCES BY APPLICATION OF PARTICULARLY TRANSPARENT POLYMETHACRYLATE LAYERS

The present invention is oriented towards a process for producing composite materials. In particular, the invention relates to a process for the surface finishing of materials by means of polymethacrylate layers. The polymer layers used for surface finishing here, based on polymethacrylates, are prepared from certain polymethacrylate copolymers and are applied in a certain manner to the substrates.

Surface-finished articles are known manufacturing products which are desirable for many different uses, because they have the advantageous combination of physical properties not possessed by the individual components of the material.

Polymethacrylates are known to give surface-finished materials a high level of desired properties, in particular high transparency, scratch resistance and weathering resistance.

There has therefore been no lack of attempts to prepare, for example, PMMA-coated materials. However, one problem with these coatings is the fact that there is often no, or only very little, adhesion between the layers of different types. This leads to premature separation of the protective layer, or at least to limited processability of the composite materials.

An ideal protective layer has good adhesion to the substrate, and at the same time is hard and flexible, resistant to the effects of weathering, solvents, abrasion and heat. It is difficult to optimize all of these properties, because improvement in one property is mostly achieved at the expense of others. Specifically during the machining and shaping of previously surface-finished substrates, high elasticity and adhesion is desirable in order to prevent break-away of the protective layer at points of small-radius curvature.

At the same time, the protective layer should be sufficiently hard to resist mechanical effects.

Adhesives can be utilized to ensure adequate adhesion between the surface finish and the materials, which mostly have a chemically different structure. In this connection it has moreover proven advantageous to construct covalent bonds between the substrate and the protective layer (termed: capstock) (Schultz et al., J. Appl. Polym. Science 1990, 40, 113-126; Avramova et al. 1989, 179, 1-4). By way of example, this is achieved via incorporation of specific monomers (reactive monomers) into the polymer matrix of the protective layer, these being capable of reacting with the radicals on the surface of the substrate or the adhesive adhering thereto.

EP911148 proposes adhesives which comprise, inter alia, "reactive monomers" and are suitable for attaching LCP films to polyethylene substrates. The multiple films are heated above the melting point of the highest-melting individual component, in order to achieve intimate fusion between the individual films.

EP271068 reports blends composed of polyvinyl fluorides and of PMMA-GMA copolymers, which are laminated at elevated temperatures to modified styrene polymer sheets.

DE 10010533 proposes a multiple layer film composed of two layers, the first layer being composed of acrylic resin and the second layer in each case a copolymer of either an acrylic resin and of an olefin-based copolymer, obtained via copolymerization of an olefin and of at least one monomer selected from, by way of example, unsaturated carboxylic acids, carboxylic anhydrides or glycidyl-containing monomers. This film is intended to have excellent melt adhesion to polyolefin-based resin substrates.

This process therefore laminates two polymer layers one to the other and then, by means of an adhesive-bonding and forming process, for example, applies their side comprising the "reaction monomers" to the polyolefin resin intended for lamination.

DE4337062 laminates metal sheets with triple layers composed of thermoplastic resins in such a way that the temperature established during the extrusion-coating procedure is above the glass transition temperature of the inner resin layer by at least 30° C.

The Japanese application H9-193189 describes, as does DE10010533, a multiple layer composite composed of a first layer which is composed of a thermoplastic PMMA, a second layer composed of a reactively modified polyolefin and a third layer which is composed of a coloured olefin polymer.

To obtain the desired abovementioned advantageous properties of the materials, such as high and long lasting adhesion, etc., the prior art merely proposes specific individual solutions which cannot be generalized or which have apparent disadvantages relating to apparatus cost or logistics cost, for example in particular the processing of multilayer materials as protective layer. On the basis of this known prior art, therefore, there still remains a need for new surface finishing techniques which provide advantages for technical applications or in the production process.

It was therefore an object of the present invention to provide a further process for the surface finishing of materials, and to provide the composite materials produced by means of this process. The process should in particular permit the person skilled in the art to apply a polymethacrylate-based protective layer (capstock) in a very simple and efficient manner to a very large number of substrate materials, with maximum development of the abovementioned advantageous and desired properties. A factor to which very particular attention should be paid is that the variability of substrate materials should not be gained at the expense of efficiency and ease of operation of the process used according to the invention on an industrial scale.

Figure 1:
FIG. 1 and FIG. 3 are SEMs for a comparative film having significant visible separation during fracture of a test specimen.

The object is achieved by way of a process with the features of the present Claim 1. Preferred embodiments of the inventive process can be found in the subclaims dependent on Claim 1. Claim 5 protects the composite materials thus produced.

A highly advantageous and, surprisingly, extremely elegant method of achieving the object set consists in a process for the surface finishing of materials, where the surface finishing is based on at least one thermoplastic polymethacrylate layer which is obtainable via:

Mixing of polymers for which the basis is provided by polymerized monomer mixtures a. and b., where a. comprises:

A) from 20 to 100% by weight of methyl methacrylate,

B) from 0 to 80% by weight of a (meth)acrylate of the formula I, other than methyl methacrylate,

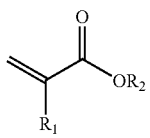

where
R₁ is hydrogen or methyl and

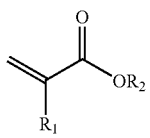

R₂ is a linear or branched alkyl radical or cycloalkyl radical having from 1 to 18 carbon atoms or is phenyl or naphthyl,
C) from 0 to 40% by weight of a further unsaturated monomer other than a.A) and a.B), but copolymerizable with these, where (a.A) to (a.C) together give 100% by weight, and from 0 to 80 parts by weight of further polymers, and also amounts of from 0 to 150 parts by weight of conventional additives, are, added to 100 parts by weight of this polymerized mixture; and b. comprises:
A) from 20 to 99% by weight of a methyl (meth)acrylate of the formula I
where
R₁ is hydrogen or methyl and
R₂ is a linear or branched alkyl radical or cycloalkyl radical having from 1 to 18 carbon atoms, or is phenyl or naphthyl,
B) from 1 to 80% by weight of one or more ethylenically unsaturated "reactive monomers" other than b.A) but copolymerizable with (b.A), where (b.A) and (b.B) together give 100% by weight, and
from 0 to 80 parts by weight of further polymers, and also amounts of from 0 to 150 parts by weight of conventional additives, are added to 100 parts by weight of this polymerized mixture;
and the polymethacrylate layer is applied to the material at temperatures which permit chemical bonding of the polymethacrylate layer to the material.

The inventive process permits the surface finishing of a wide variety of materials without use of multilayer systems or use of adhesives, since the polymethacrylate layer is composed of a blend of two poly(meth)acrylate-based polymers, where one of the constituents of the surface finish provides the properties of pure polymethacrylate and the other portion provides the appropriate means for the bonding of this layer to the substrate. The active chemical crosslinking between the polymer layer and the substrate is developed here via the elevated temperature during the finishing process. Alongside the construction of chemical bonds here, some degree of interpenetration between substrate and polymer layer can act to promote adhesion (in particular in the case of porous, rough or fibrous substrate materials).

Component a.A) is an essential component. This is methyl methacrylate, which makes up from 20 to 100% by weight of the polymerizable mixture a. from which the polymer layer is obtainable. If its proportion makes up 100% by weight, this mixture corresponds to homo-PMMA. If the proportion is smaller than 100% by weight, the polymer is a co- or terpolymer composed of 3 or more types of monomer. The polymerized mixture a. is then a co- or terpolymer.

Component a.B) is therefore optional. It involves an acrylic or methacrylic ester other than methyl methacrylate. A linear or branched $C_1$-$C_{18}$-alkyl radical is a range of alkyl radicals extending from methyl via ethyl to a radical encompassing 18 carbon atoms. Also encompassed here are all of the conceivable structural isomers within the group. Mention may particularly be made of butyl methacrylate, 2-ethylhexyl methacrylate, cyclohexyl methacrylate, phenyl methacrylate, and also naphthyl methacrylate.

In the mixtures a.B) it is preferable to use (meth)acrylates where the radical $R_2$ of the (meth)acrylate of the formula I encompasses a linear or branched $C_1$-$C_8$-alkyl radical. Among these, the methyl, ethyl or n-butyl radical is in turn particularly suitable for $R_2$.

The expression "(meth)acrylate" means acrylate and/or methacrylate for the purposes of the invention.

The polymerizable component a.C) for obtaining the polymethacrylate layer is optional. Monomers other than A) and a.B) are understood by the person skilled in the art to be styrene and its derivatives, vinyl esters, e.g. vinyl acetate, vinyl propionate, vinyl esters of higher-alkyl acids, vinyl chloride, vinyl fluoride, olefins, e.g. ethene, propene, isobutene, and the like.

The polymerized mixtures a. and b. usually also comprise amounts of up to 150 parts by weight of additives known per se (per 100 parts by weight of a.A)-a.C) and, respectively, b.A) and b.B)). By way of example, mention may be made of calcium carbonate (chalk), titanium dioxide, calcium oxide, perlite, and precipitated and coated chalks as rheologically active additives, and also, where appropriate, agents with thixotropic action, e.g. fumed silica. The grain size is mostly in the range from 5 to 25 μm. As required by the use of the material, the mixture a. or b. may also comprise auxiliaries known per se, e.g. adhesion promoters, wetting agents, stabilizers, flow control agents, or blowing agents in proportions of from 0 to 5% by weight (based on the mixtures a.A) to a.C) and, respectively, b.A) and b.B)). By way of example, mention may be made of calcium stearate as flow control agent.

In the interest of completeness, mention should be made of the possibility of also admixing further components or polymers, such as impact modifiers and impact-modified PMMA moulding compositions, with the polymerized mixtures a. and/or b. (DE3842796 and U.S. Pat. No. 6,475,420). The polymeric mixtures a. and/or b. preferably also comprise further polymers used in industrial processes, and these may be selected, inter alia, from the group of the polyvinylidene difluorides (PVDF), PVC, polyethylenes, polyesters, polyamides. Very particular preference is given in this connection to the use of vinylidene-fluoride-based fluoropolymers (WO0037237).

Component b.A) encompasses the entirety of components a.A) and a.B).

Component b.B) in the mixture b. is a "reactive monomer" which has adhesion-improving properties. The adhesion-improving monomers (reactive monomers) which are constituents of the polymethacrylates are those monomers capable of free-radical polymerization which have functional groups which can interact with the materials to be coated. This interaction is to be brought about at least via a chemical (covalent) bond. In addition, it may be promoted, by way of example, by hydrogen bonding, complexing, dipole forces or thermodynamic compatibility (intertwining of the polymer chains) or the like. The interactions generally involve heteroatoms, such as nitrogen or oxygen. Functional groups which may be mentioned are the amino group, in particular the dialkylamino group, (cyclic) amide group, imide group, hydroxy group, (ep)oxy group, carboxy group, (iso)cyano group. These monomers are known per se (cf. H. Rauch Puntigam, Th. Völker, Acryl-und Methacrylverbindungen [Acrylic and methacrylic compounds], Springer-Verlag 1967; Kirk-Othmer, Encyclopedia of Chemical Technology, 3rd. Ed., Vol. 1, pp. 394-400, J. Wiley 1978; DE-A 25 56 080; DE-A 26 34 003).

The adhesion-improving monomers therefore preferably belong to the monomer class of the nitrogen-containing vinyl heterocycles preferably having 5-membered rings alongside 6-membered rings, and/or of the copolymerizable vinylic carboxylic acids and/or of the hydroxyalkyl-, alkoxyalkyl-, epoxy- or aminoalkyl-substituted esters or amides of fumaric, maleic, itaconic, acrylic, or methacrylic acid.

Nitrogen-heterocyclic monomers which may particularly be mentioned are those from the class of the vinylimidazoles, of the vinyllactams, of the vinylcarbazoles, and of the vinylpyridines. Examples of these monomeric imidazole compounds, which are not intended to represent any form of restriction, are N-vinylimidazole (also termed vinyl-1-imidazole), N-vinylmethyl-2-imidazole, N-vinylethyl-2-imidazole, N-vinylphenyl-2-imidazble, N-vinyldimethyl-2,4-imidazole, N-vinylbenzimidazole, N-vinylimidazoline (also termed vinyl-1-imidazoline), N-vinylmethyl-2-imidazoline, N-vinylphenyl-2-imidazoline and vinyl-2-imidazole.

Particular examples which may be mentioned of monomers derived from the lactams are compounds such as the following: N-vinylpyrrolidone, N-vinylmethyl-5-pyrrolidone, N-vinylmethyl-3-pyrrolidone, N-vinylethyl-5-pyrrolidone, N-vinyldimethyl-5,5-pyrrolidone, N-vinylphenyl-5-pyrrolidone, N-allylpyrrolidone, N-vinylthiopyrrolidone, N-vinylpiperidone, N-vinyldiethyl-6,6-piperidone, N-vinylcaprolactam, N-vinylmethyl-7-caprolactam, N-vinylethyl-7-caprolactam, N-vinyldimethyl-7,7-caprolactam, N-allylcaprolactam, N-vinylcaprylolactam.

Among the monomers which derive from carbazole mention may particularly be made of: N-vinylcarbazole, N-allycarbazole, N-butenylcarbazole, N-hexenylcarbazole and N-(methyl-1-ethylene)carbazole. Among the copolymerizable vinylic carboxylic acids, mention may in particular be made of maleic acid, fumaric acid, itaconic acid and suitable salts, esters or amides of the same.

Mention may also be made of the following epoxy-, oxy- or alkoxy-substituted alkyl esters of (meth)acrylic acid: glycidyl methacrylate, 2-hydroxyethyl (meth)acrylate, hydroxypropyl (meth)acrylate, 2-methoxyethyl (meth)acrylate, 2-ethoxyethyl (meth)acrylate, 2-butoxyethyl (meth)acrylate, 2-(2-butoxyethoxy)ethyl methacrylate, 2-(ethoxyethyloxy)ethyl (meth)acrylate, 4-hydroxybutyl (meth)acrylate, 2-[2-(2-ethoxyethoxy)ethoxy]ethyl (meth)acrylate, 3-methoxybutyl 1-(meth)acrylate, 2-alkoxymethylethyl (meth)acrylate, 2-hexoxyethyl (meth)acrylate.

Mention may also be made of the following amine-substituted alkyl esters of (meth)acrylic acid:

2-dimethylaminoethyl (meth)acrylate, 2-diethylaminoethyl (meth)acrylate, 3-dimethylamino-2,2-dimethylpropyl 1-(meth)acrylate, 3-dimethylamino-2,2-dimethylpropyl 1-(meth)acrylate, 2-morpholinoethyl (meth)acrylate, 2-tert-butylaminoethyl (meth)acrylate, 3-(dimethylamino)propyl (meth)acrylate, 2-(dimethylaminoethoxyethyl) (meth)acrylate.

Mention may be made by may of example of the following monomers which are representatives of the (meth)acrylamides:

N-methyl(meth)acrylamide, N-dimethylaminoethyl (meth)-acrylamide, N-dimethylaminopropyl(meth)acrylamide, N-isopropyl(meth)acrylamide, N-tert-butyl(meth)acrylamide, N-isobutyl(meth)acrylamide, N-decyl(meth)acrylamide, N-cyclohexyl(meth)acrylamide, N-[3-(dimethylamino)-2,2-dimethylpropyl]methacrylamide, N-[2-hydroxyethyl](meth)acrylamide.

In the mixture b., it is advantageous to use "reactive monomers" selected from the group consisting of GMA (glycidyl methacrylate), maleic acid derivatives, such as maleic acid, maleic anhydride (MA), methylmaleic anhydride, maleimide, methylmaleimide, maleamides (MAs), phenylmaleimide and cyclohexylmaleimide, fumaric acid derivatives, methacrylic anhydride, acrylic anhydride.

The ratio of the polymerized monomer mixtures a. and b. in the polymethacrylate-based surface finish may be selected by the person skilled in the art as desired and adapted to the substrate to be protected. For cost reasons, component a. will generally be predominant in the polymerized layer. It is particularly preferable to use 50 to 99% by weight of the polymerized mixture a., to the corresponding amount of b. The a.:b. ratio should particularly preferably be 60-90:40-10% by weight. It is very particularly preferable to utilize a mixture of the polymers where a.:b. is 75-85:25-15% by weight.

The composition of further preferred polymer layers is set out below:

a.A: 20 to 100% by weight, preferably from 30 to 100% by weight, particularly preferably from 40 to 99% by weight a.B: from 0 to 80% by weight, preferably from 0 to 70% by weight, particularly preferably from 1 to 60% by weight a.C: from 0 to 40% by weight, preferably from 0 to 35% by weight, particularly preferably from 0 to 32% by weight additives to a.: from 0 to 150 parts by weight, preferably from 0 to 100 parts by weight, particularly preferably from 0 to 50 parts by weight.

b.A: from 20 to 99% by weight, preferably from 30 to 99% by weight, particularly preferably from 40 to 98% by weight b.B: from 1 to 80% by weight, preferably from 1 to 70% by weight, particularly preferably from 2 to 60% by weight additives to b.: from 1 to 150 parts by weight, preferably from 0 to 100 parts by weight, particularly preferably from 0 to 50 parts by weight.

The polymer mixtures mentioned may be polymerized individually by methods known to the person skilled in the art, and mixed and finally used for surface finishing. The method of applying the resultant polymer layer to the substrate may in turn be one known to the person skilled in the art. However, the temperature established is adequate to give adequate formation of the covalent surface bonds and to give interpenetration of the strands of polymer at the surface into the substrate. This temperature is generally above the glass transition temperature of the polymer layer to be applied. It is particularly advantageous for this temperature to be set significantly above the glass transition temperature ($T_G$), therefore being $>T_G+20°$ C., particularly preferably $>T_G+50°$ C. and very particularly preferably $>T_G+80°$ C.

Preferred processes for applying the surface finish are common technical knowledge (Henson, Plastics Extrusion Technology, Hanser Publishers, 2nd Edition, 1997). Among preferred processes for applying the polymethacrylate layer in the form of a melt are coextrusion coating and melt coating. The surface finish in the form of a film may be applied by colamination, extrusion lamination, adhesive bonding, coil coating, sheathing or high-pressure lamination.

In addition to the measures described, it can be advantageous to apply an adhesive between the material and the polymethacrylate-based protective layer to be applied, i.e. to use an adhesive prior to application of the protective layer, to treat that side of the material which is to be protected. This is necessary in particular when the material to be finished has no, or only insufficient, capability to form chemical bonds to the surface-finishing polymethacrylate layer. According to the invention, the material to be finished is understood in such cases to be the original material together with adhesive.

The nature of this adhesive should be such that it enters into reactive interaction with the protective layer resulting in covalent bonds between protective layer and adhesive.

Adhesives of this type are in principle known to the person skilled in the art.

Preferred adhesive materials are proposed in Römpp Chemie Lexikon [Römpp's Chemical Encyclopaedia], Georg Thieme Verlag Stuttgart, 9th Edition, 1990, Volume 3, pp. 2252 et seq.

For the purposes of the invention, particular preference is given to adhesives selected from the group consisting of GMA-modified polyolefins, e.g. ELVALLOY® AS, Dupont, and also ethylene-vinyl acetate copolymers (e.g. MORMELT® 902, Rohm and Haas Co.).

Another embodiment of the invention provides the composite materials produced according to the invention. In principle, the polymer layers may be applied according to the invention on any of the materials which the person skilled in the art considers appropriate for this purpose. Preferred appropriate materials selected are: wood, wood veneer, paper, other polymer materials, such as polyurethanes, polystyrenes, polyvinyls, polyesters, polyamides, synthetic or natural rubbers, metals, and thermoset materials, such as high-pressure laminates.

The substrate materials may take the form of a film or sheet, or cut-to-size film or sheet. In this connection, particular emphasis should be given to substrate materials such as polyethylene textiles, these being used in the greenhouse film industry, for example.

Very highly preferred composite materials produced according to the invention comprise decorative high-pressure laminates (HPLs) to EN 438-6, which are composed of layers of webs of fibrous material (e.g. paper), impregnated with curable resins, these being bonded to one another by means of the high-pressure process described below. The surface layer of the material, one or both sides of which have decorative colours or patterns, is impregnated with resins based on amino plastics, e.g. melamine resins. The amino or methylolamino groups present in the decorative layer during the high-pressure process then serve as reaction partners for covalent bonding to the polymethacrylate layer (in this case films) for surface finishing.

The high-pressure process produces a long lasting bond between the decorative layer and the polymethacrylate layer applied according to the invention. The temperature set during the process and the associated interpenetration of the melamine-resin-saturated decorative paper into the film ensures sufficient formation of covalent bonds and therefore long lasting bonding to the material.

The high-pressure process is defined as the simultaneous use of heat (temperature greater than or equal to 120° C.) and high pressure (greater than or equal to 7 MPa), the result being that the curable resins flow and then harden to produce a homogeneous non-porous material of relatively high density (at least 1.35 g/cm$^3$) having the required surface structure.

A suitable, in particular transparent, outer layer or coating is in particular added for surface finishing purposes in outdoor applications in order to generate properties of weather-resistance and light-resistance.

The polymers and copolymers which can be used as a constituent of the polymethacrylate layer according to the invention are bulk polymers, solution polymers, emulsion polymers or suspension polymers, where appropriate with bimodal or multimodal particle size distribution.

For the purposes of the invention, bi- or multimodal distribution of the particle sizes in the polymethacrylate layer is present when a specimen of the polymer and copolymer used as, or in, the polymethacrylate layer has (at least) two peaks in the distribution spectrum on analysis by the PIDS method, using the Coulter LS230 laser particle analyser, taking into account the optical parameters of particles and of the suspension liquid. The size distribution of primary particles in dispersions is in particular taken as the basis for determining the particle size distribution. After drying of the dispersions, the primary particles from the dispersion may have agglomerated to give secondary particles with different particle size distribution.

The bi- or multimodal bulk polymers, solution polymers, emulsion polymers or suspension polymers and corresponding copolymers of the polymethacrylate layer may in principle be obtained via polymerization of monomers to give polymers with bi- or multimodal particle size distribution, or via mixing of two or more suitable monomodal bulk polymers, solution polymers, emulsion polymers or suspension polymers which differ in particle size distribution. The monomodal polymers may in turn be polymers obtained directly via bulk polymerization, solution polymerization, emulsion polymerization or suspension polymerization, but it is also possible to use fractions obtained from these polymers, by way of example, via separation, e.g. in a sieving procedure.

One variant for obtaining a bi- or multimodal polymer mixture for an inventive polymethacrylate layer therefore envisages the mixing of two or more monomodally distributed dispersions. The dispersion mixture may then be dried by a method known per se, for example by spray drying, to isolate the polymethacrylate. Alternatively, it can be advantageous to prepare the necessary dispersion directly with particles of bi- or multimodal size distribution via suitable selection of different seed lattices, and growing monomer onto the different seed lattices. However, the mixing of monomodal dispersions is significantly preferred because reproducibility is greater. To obtain the polymers and copolymers, the mixture of the dispersions may be spray-dried, for example. Other ways of isolating particles from dispersions may, of course, also be used. It is also possible to mix isolated polymers and copolymers from monomodal dispersions.

A further improvement in the properties of inventive polymethacrylate layers may be achieved, inter alia, also via the molar mass of the reactive polymers and copolymers used. One preferred variant envisages that the weight-average molar mass $M_w$ of the polymers and/or copolymers of the (meth)acrylates containing "reactive monomers" is in the range from 10 000 to >200 000 g/mol.

Particularly advantageous properties are obtained in the polymethacrylate layers when the weight-average molar mass $M_w$ of the reactively modified polymers and copolymers is in the range from 15 000 to 150 000 g/mol.

The weight-average molar mass $M_w$ of a polymer is determined for the purposes of the invention by means of SEC or GPC (size exclusion chromatography or gel permeation chromatography) against standards composed of polystyrene. SEC or GPC are analysis methods known to the person skilled in the art of polymers for the determination of molar mass averages.

Another variable which may be used for the purposes of the invention to characterize the molar mass of the polymers and copolymers used is the viscosity number VN. The viscosity number is determined by a method based on ISO 1628.

For example, in a preferred embodiment, inventive polymethacrylate layers comprise polymers and/or copolymers with VN≧10, preferably >20, expediently >30, particularly preferably <10 000, very particularly preferably <80 and with very high preference <70.

The inventive process permits the production of novel composite materials in a simple and inexpensive manner, while nevertheless optimizing the adhesion of the finishing layer, and its transparency and weathering resistance. At the very least, it was certainly not obvious from the prior art that the process described could give the entirety of these advantageous properties.

EXAMPLE 1a (INVENTIVE)

Surface Finishing of Decorative High-Pressure Laminates
Preparation of a Copolymer from MMA/Styrene/Maleic Anhydride (75:15:10) (Component b)

A monomer mixture composed of 6279 g of methyl methacrylate, 1256 g of styrene and 837 g of maleic anhydride is treated with 1.9 g of tert-butyl perneodecanoate and 0.84 g of tert-butyl 3,5,5-trimethylperoxyhexanoate as polymerization initiators and 20.9 g of 2-mercaptoethanol as molecular weight regulator, and also with 4.2 g of palmitic acid.

The resultant mixture is charged to a polymerization cell and devolatilized for 10 minutes. The mixture is then polymerized at 60° C. for 6 hours in a water bath, and then 30 hours at a water bath temperature of 55° C. Once the polymerization cell has been removed from the water bath, the polymer in the polymerization cell is heat-conditioned for a further 7 hours at 117° C. in a hot-air cabinet.

The resultant copolymer is clear and almost colourless and has a VN (solution viscosity number to ISO 1628-6, 25° C., chloroform) of 44.4 ml/g. Molar mass determination by GPC, using PMMA calibration standards, gave:

$M_n=34\,200$ g/mol, $M_w=86\,300$ g/mol, $M_w/M_n=2.52$. The flowability of the copolymer was determined to ISO 1133 at 230° C. with a load of 3.8 kg as MVR=4.85 cm$^3$/10 min.

This copolymer was then pelletized and devolatilized by a single-screw extruder process.

Figure 2:
FIG. 2 and FIG. 4 are SEMs for a film of a thickness 40 μhaving satisfactory adhesion.
Figure 4:
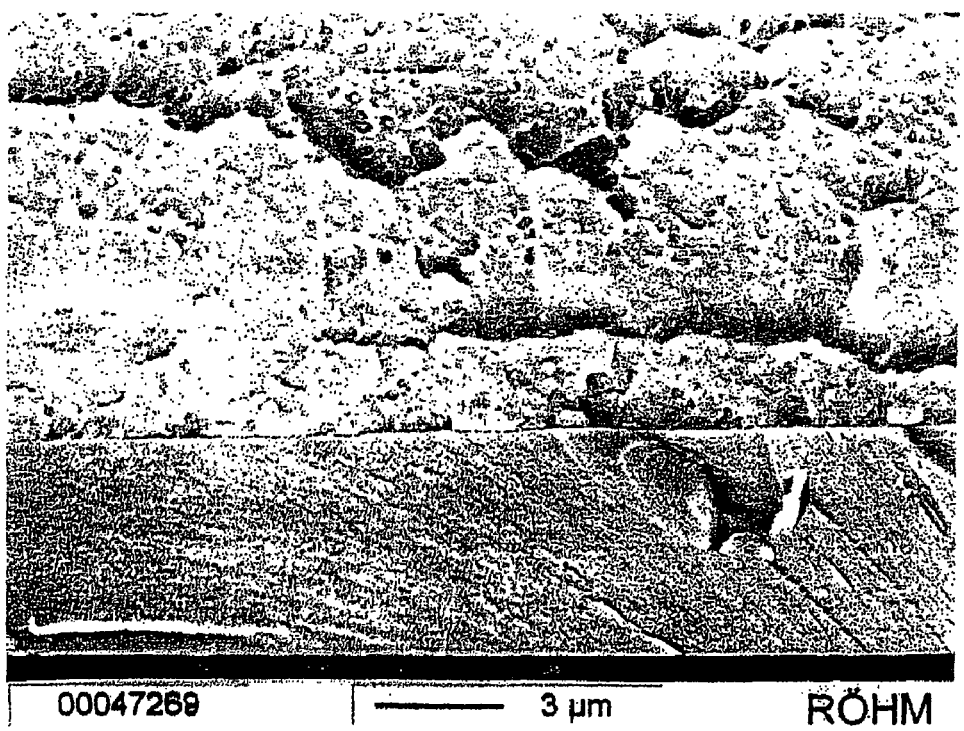

The impact-resistant PMMA moulding composition (component a) is prepared in accordance with DE 3842 796, Example 1.
Production of the Inventive Film:

This pelletized and devolatilized copolymer. (component b.) is mixed with pellets of an impact-resistant PMMA moulding composition based on emulsion polymer (component a.) in the ratio of 20 parts of copolymer to 80 parts of impact-resistant moulding composition, and then extruded (chill roll extrusion) to give a film of thickness 40 μm, by means of a single-screw extruder followed by an extrusion die designed for film extrusion.
Production of the Inventive Composite Material:

Takes place using the high-pressure process described on page 14 at a temperature of 140° C. and a pressure of 10 N/mm$^2$.
Valuation of the advantageous properties of the invention:

Cross-cut to ISO 2409: no separation (GT 0), straight cut edge
  Boiling test (2 h/100° C.): no separation
  Warm water test (48 h at 65° C.): no separation
  In addition, the advantageous properties of the invention are supported by scanning electron micrographs (SEMs) of the fracture edge of a test specimen fractured at room temperature: SEMs 260 (FIG. 2) and 269 (FIG. 4); satisfactory adhesion of the film of thickness 40 μm.

EXAMPLE 1b

Comparative Example

Figure 3:
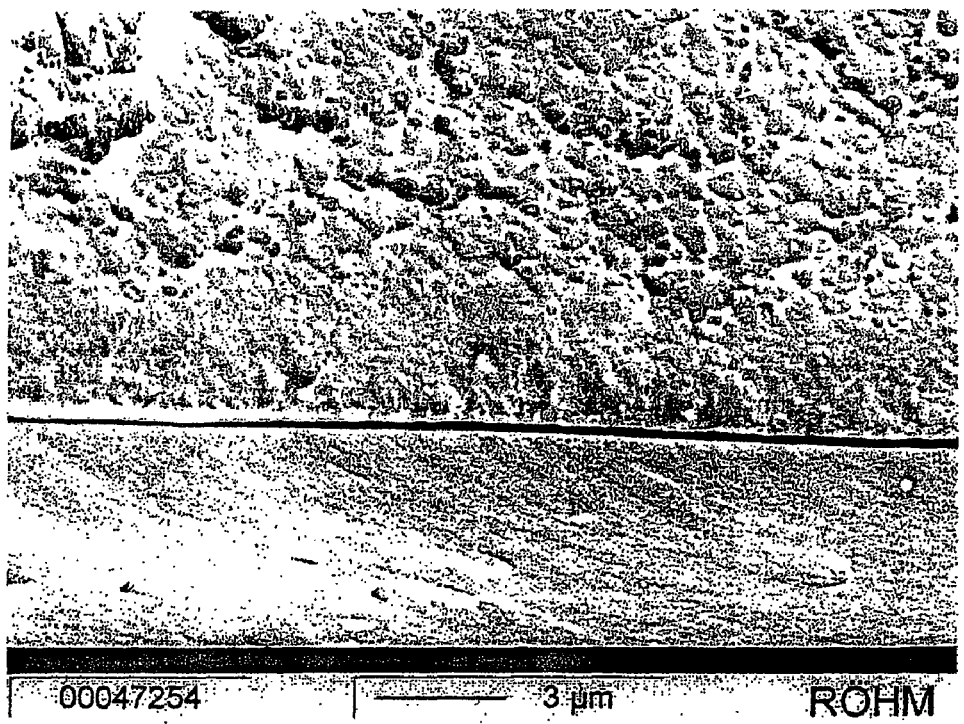

Procedure Based on Example 1a), but Addition of Component b Omitted.
Relevant Properties Compared:
  Cross cut: significant separation (GT 2), frayed cut edge
  Boiling test: significant separation
  Warm water test: significant separation
  In this connection see SEMs 245 (FIG. 1) and 254 (FIG. 3); significant visible separation of film during fracture of test specimen.

EXAMPLE 2

Surface Finishing of PE-Based Textile Films

Preparation of a Copolymer from MMA-Methyl Acrylate/Methacrylic Acid (88:4:8):

A monomer mixture composed of 7040 g of methyl methacrylate, 640 g of methacrylic acid and 320 g of methyl acrylate is treated with 2.4 g of tert-butyl perneodecanoate as polymerization initiator and 44.0 g of 2-ethylhexyl thioglycolate as molecular weight regulator.

The resultant mixture is charged to a polymerization cell and devolatilized for 10 minutes. The mixture is then polymerized at 50° C. for 30 hours in a water bath. Once the polymerization cell has been removed from the water bath, the polymer in the polymerization cell is heat-conditioned for a further 10 hours at 120° C. in a hot-air cabinet.

The resultant copolymer is clear and almost colourless and has a VN (solution viscosity to ISO 1628-6, 25° C., chloroform) of 0.44.9 ml/g. This copolymer (component b.) was then pelletized and devolatilized by a single-screw extruder process.

The impact-resistant PMMA moulding composition (component a) is prepared in accordance with DE 3842 796, Example 1.
Production of the Inventive Film:

This pelletized and devolatilized copolymer (component b.) is mixed with pellets of an impact-resistant PMMA moulding composition based on emulsion polymer (component a.) in the ratio of 40 parts of copolymer to 60 parts of impact-resistant moulding composition, and then extruded (chill roll extrusion) to give a film of thickness 45 μm, by means of a single-screw extruder followed by an extrusion die designed for film extrusion.
Production of Inventive Composite Material:

The inventive film was coated with the PE-based textile film substrate in an extrusion coating system designed for film coating and film colamination, using the thermoplastic hot-melt adhesive MORMELT® 902 (melting point about 220° C.) based on ethylene-vinyl acetate copolymer.

The film composite material produced exhibits no delamination at all in the adhesion tests described in the Example.

The invention claimed is:
1. A process for the surface finishing of a material, comprising:
  applying at least one thermoplastic polymethacrylate layer to the material at temperatures which permit chemical bonding of the polymethacrylate layer to the material to obtain a surface finished composite material;
  wherein said polymethacrylate layer is transparent;

wherein the at least one thermoplastic polymethacrylate layer is obtained by:
mixing at least one polymer based on polymerized monomer mixture a. and at least one polymer based on polymerized monomer mixture b.,
wherein the polymerized mixture a. is present in the polymethacrylate-based surface finish in an amount of 50 to 99% by weight and a corresponding amount of the polymerized mixture b. is present in the polymethacrylate-based surface finish to give a total amount of the sum of a. and b. of 100% by weight;
wherein monomer mixture a. comprises:
wherein a. comprises:
A) from 20 to 100% by weight of methyl methacrylate,
B) from 0 to 80% by weight of a (meth)acrylate of the formula I, other than methyl methacrylate,

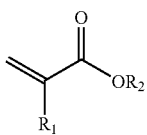
(I)

wherein $R_1$ is a hydrogen or a methyl, and $R_2$ is a linear or branched alkyl radical or cycloalkyl radical having from 1 to 18 carbon atoms or is phenyl or naphthyl,
C) from 0 to 40% by weight of a further unsaturated monomer other than a.A) and a.B), but copolymerizable with these, wherein (a.A) to (a.C) together give 100% by weight of the copolymerizable constituents of a., and from 0 to 80 parts by weight of further polymers, and also amounts of from 0 to 150 parts by weight of conventional additives, are added to 100 parts by weight of this polymerized mixture;
and monomer mixture b. comprises:
A) from 20 to 99% by weight of a methyl (meth)acrylate of the formula I wherein
$R_1$ is a hydrogen or a methyl and
$R_2$ is a linear or branched alkyl radical or cycloalkyl radical having from 1 to 18 carbon atoms, or is phenyl or naphthyl,

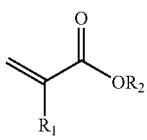
(I)

B) from 1 to 80% by weight of one or more ethylenically unsaturated "reactive monomers" other than b.A) but copolymerizable with (b.A), wherein (b.A) and (b.B) together give 100% by weight of the copolymerizable constituents of b., and
from 0 to 80 parts by weight of further polymers, and also amounts of from 0 to 150 parts by weight of conventional additives, are added to 100 parts by weight of this polymerized mixture;
wherein component b.B) has a functional group which can interact with the material to be coated;
wherein said functional group is an amino group, a (cyclic) amide group, an imide group, a hydroxy group, an (ep)oxy group, a carboxy group, or an (iso)cyano group;

wherein component b.B) is selected from the group consisting of i) a nitrogen-containing vinyl heterocycle having 5-membered rings alongside 6-membered rings, ii) vinylimidazoles, iii) vinyllactams, iv) vinylcarbazoles, v) vinylpyridines, vi) glycidyl methacrylate, vii) maleic acid, viii) maleic anhydride, ix) methylmaleic anhydride, x) maleimide, xi) methylmaleimide, xii) maleamides, xiii) phenylmaleimide, xiv) cyclohexylmaleimide, xv) fumaric acid derivatives, xvi) methacrylic anhydride, and xvii) acrylic anhydride.

2. The process according to claim 1, wherein the further polymer used comprises those selected from the group consisting of polyvinylidene difluoride, PVC, polyethylene, polyester, and polyamides.

3. The process according to claim 1, wherein the surface-finishing method applies a melt by means of coextrusion coating or melt coating.

4. The process according to claim 1, wherein the surface-finishing method applies a film by colamination, extrusion lamination, adhesive bonding, coil coating, sheathing or high-pressure lamination.

5. The process according to claim 1, wherein the material is treated with an adhesive prior to application of the surface finish.

6. The process according to claim 1, wherein no multilayer system or adhesive is used.

7. The process according to claim 1, wherein chemical crosslinking between the polymethacrylate layer and the material is developed via an elevated temperature during a finishing process.

8. The process according to claim 1, wherein interpenetration between material and polymethacrylate layer occurs.

9. The process according to claim 1, wherein component a.B) is butyl methacrylate, 2-ethylhexyl methacrylate, cyclohexyl methacrylate, phenyl methacrylate, or naphthyl methacrylate.

10. The process according to claim 1, wherein said additive is calcium carbonate, titanium dioxide, calcium oxide, perlite, precipitated chalk, coated chalk, or fumed silica.

11. The process according to claim 1, wherein component b.B) is capable of free-radical polymerization.

12. The process according to claim 1, wherein the material is in the form of a film or sheet, or cut-to-size film or sheet.

13. The process according to claim 1, wherein the material is a polyethylene textile.

14. A process for the surface finishing of a material, comprising:
applying at least one thermoplastic polymethacrylate layer to the material at temperatures which permit chemical bonding of the polymethacrylate layer to the material to obtain a surface finished composite material having simultaneously good adhesion of the finishing layer, transparency and weathering resistance;
wherein no adhesive is used;
wherein chemical crosslinking between the polymethacrylate layer and the material is developed via an elevated temperature during the process of obtaining the surface finished composite material;
wherein said polymethacrylate layer is transparent;
wherein the at least one thermoplastic polymethacrylate layer is obtained by:
mixing at least one polymer based on polymerized monomer mixture a. and at least one polymer based on polymerized monomer mixture b.,
wherein the polymerized mixture a. is present in the polymethacrylate-based surface finish in an amount of 50 to 99% by weight and a corresponding amount of the polymerized mixture b. is present in the polymethacrylate-based surface finish to give a total amount of the sum of a. and b. of 100% by weight;
wherein monomer mixture a. comprises:
A) from 20 to 100% by weight of methyl methacrylate,
B) from 0 to 80% by weight of a (meth)acrylate of the formula I, other than methyl methacrylate,

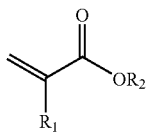

wherein $R_1$ is a hydrogen or a methyl, and $R_2$ is a linear or branched alkyl radical or cycloalkyl radical having from 1 to 18 carbon atoms or is phenyl or naphthyl,
C) from 0 to 40% by weight of a further unsaturated monomer other than a.A) and a.B), but copolymerizable with these, wherein component C) is styrene, a styrene derivative, a vinyl esters, vinyl chloride, vinyl fluoride or an olefin;
wherein (a.A) to (a.C) together give 100% by weight of the copolymerizable constituents of a., and from 0 to 80 parts by weight of further polymers, and also amounts of from 0 to 150 parts by weight of conventional additives, are added to 100 parts by weight of this polymerized mixture; and monomer mixture b. comprises:
A) from 20 to 99% by weight of a (meth)acrylate of the formula I wherein
$R_1$ is a hydrogen or a methyl and
$R_2$ is a linear or branched alkyl radical or cycloalkyl radical having from 1 to 18 carbon atoms, or is phenyl or naphthyl,

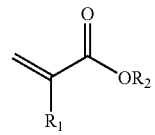

B) from 1 to 80% by weight of one or more ethylenically unsaturated "reactive monomers" other than b.A) but copolymerizable with (b.A), wherein (b.A) and (b.B) together give 100% by weight of the copolymerizable constituents of b., and
from 0 to 80 parts by weight of further polymers, and also amounts of from 0 to 150 parts by weight of conventional additives, are added to 100 parts by weight of this polymerized mixture;
wherein component b.B) has a functional group which can interact with the material to be coated;
wherein said functional group is an amino group, a (cyclic) amide group, an imide group, a hydroxy group, an (ep) oxy group, a carboxy group, or an (iso)cyano group;
wherein component b.B) is selected from the group consisting of i) a nitrogen-containing vinyl heterocycle having 5-membered rings alongside 6-membered rings, ii) vinylimidazoles, iii) vinyllactams, iv) vinylcarbazoles, v) vinylpyridines, vi) glycidyl methacrylate, vii) maleic acid, viii) maleic anhydride, ix) methylmaleic anhydride, x) maleimide, xi) methylmaleimide, xii) maleamides, xiii) phenylmaleimide, xiv) cyclohexylmaleimide, xv) fumaric acid derivatives, xvi) methacrylic anhydride, and xvii) acrylic anhydride.
15. The process according to claim 14, wherein interpenetration between material and polymethacrylate layer occurs.

* * * * *